United States Patent [19]

Malm

[11] 4,347,556
[45] Aug. 31, 1982

[54] VEHICLE HEADLAMP HAVING AN INTEGRAL TRIM RIM MOUNTING ASSEMBLY

[75] Inventor: Robert N. Malm, Willoughby, Ohio

[73] Assignee: General Electric Company, Schenectady, N.Y.

[21] Appl. No.: 85,454

[22] Filed: Oct. 16, 1979

[51] Int. Cl.³ .............................................. F21V 7/00
[52] U.S. Cl. ..................................... 362/307; 362/80; 362/308; 362/368; 362/375; 362/382
[58] Field of Search ................. 362/80, 307, 308, 368, 362/375, 382

[56] References Cited

U.S. PATENT DOCUMENTS 4,144,558   3/1979   Ferrell .

Primary Examiner—Stephen J. Lechert, Jr.
Attorney, Agent, or Firm—Philip L. Schlamp; Fred Jacob

[57] ABSTRACT

This invention relates to polymer sealed beam headlamp units and more particularly to a trim rim mounting assembly for securing headlamp units to vehicles. The assembly includes a headlamp having a trim rim projecting outwardly from the exterior surface thereof. The rim references the lamp beam and has openings for receiving studs therethrough for securing the headlamp to a vehicle. In a preferred embodiment, the headlamp rim assembly has fasteners secured thereto. Studs located on the vehicle are provided with back nut stops for referentially engaging the headlamp rim as the studs are inserted through the rim openings. The back nuts in one embodiment are axially adjustable for specifying the vehicle reference plane relative to which the headlamp is attached for preaimed attachment. The rim fasteners engage the studs and lockingly secure the headlamp rim between the back nuts and rim fasteners.

11 Claims, 3 Drawing Figures

U.S. Patent   Aug. 31, 1982   4,347,556
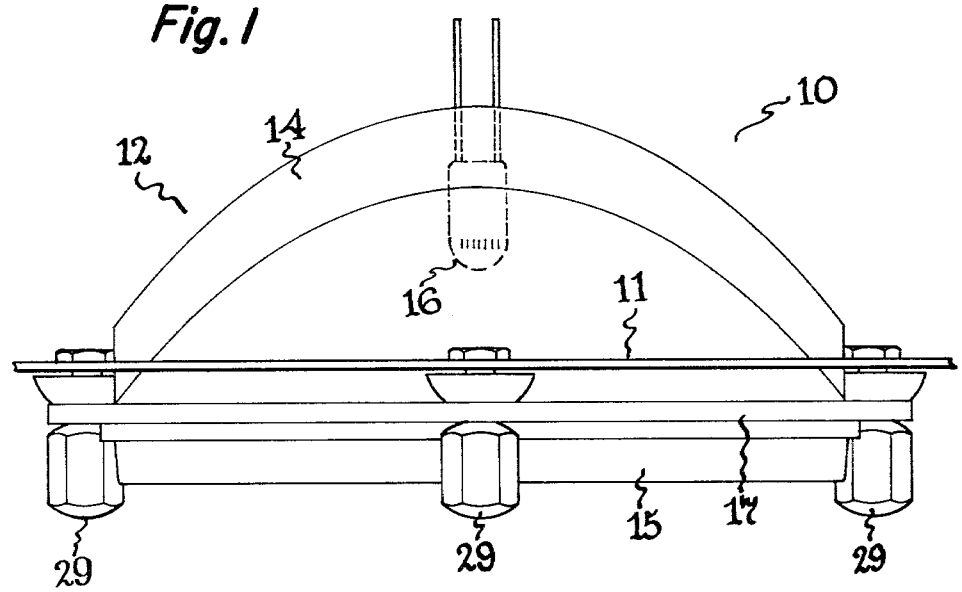
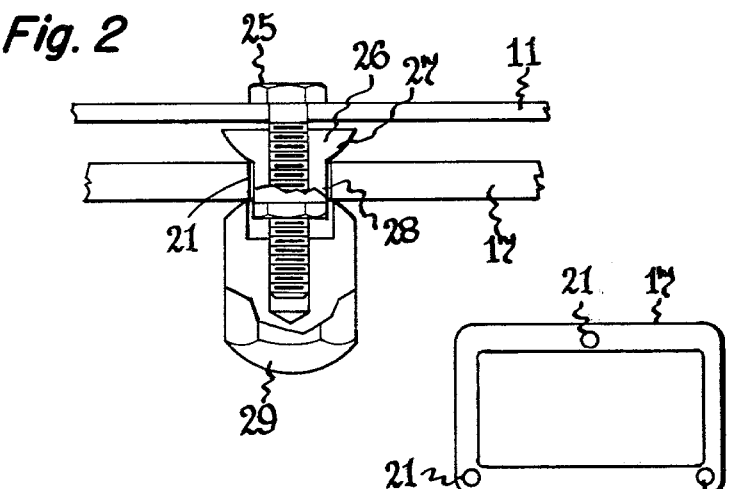

VEHICLE HEADLAMP HAVING AN INTEGRAL TRIM RIM MOUNTING ASSEMBLY

This application relates to copending applications assigned to the assignee of the present invention serial nos.: LD 7828, LD 7682, LD 7838, LD 8299, the disclosures of which are incorporated herein by reference.

This invention relates to polymer sealed beam headlamp units and more particularly to a trim rim mounting assembly for securing headlamp units to vehicles. The assembly includes a headlamp having a trim rim projecting outwardly from the exterior surface thereof. The rim references the lamp beam and has openings therethrough for receiving studs which aid in securing the headlamp to a vehicle. In a preferred embodiment, the headlamp rim assembly has fasteners secured thereto. A stud is located on the vehicle and is provided with a back nut stop for referentially engaging the headlamp rim as the stud is inserted through the rim opening. The back nut in one embodiment is axially adjustable for specifying the vehicle reference plane relative to which the headlamp is secured for preaimed attachment. The rim fastener engages the stud and lockingly secures the headlamp rim between the back nut and the rim fastener.

Headlamp mounting arrangements customarily comprise a number of heavy metal brackets and rims which structurally secure a headlamp to a vehicle. The lamp envelope is clamped at the lens-reflector interface between a series of mounting rims, which are subsequently attached to a mounting plate, which in turn is attached to the vehicle. The headlamp is first attached to the vehicle and then aimed relative thereto by turning the horizontal and vertical adjustment screws located on the assembly. The mountings are complicated and employ a considerable number of heavy metal parts which add substantially to both vehicle weight and cost. The labor costs of aiming and attaching a headlamp by these mounting arrangements are substantial and further contribute to vehicle costs.

The present invention provides an inexpensive headlamp assembly which securely attaches a lamp directly to a vehicle and eliminates the need for more complicated constructions. The assembly provides a simple low cost mounting which utilizes a minimum number of parts and enables the one step attachment and aiming of a headlamp. The assembly further provides for a low cost mounting which reduces labor costs.

The mounting assembly of the present invention and alternate embodiments thereof provide a preaimed lamp assembly which eliminates the need for adjustment of the lamp after it has been attached to the vehicle and hence further reduces assembly costs.

The vehicle headlamp assembly also exhibits improved shock and vibration absorption characteristics as compared with those of customary mounting arrangements.

The assembly in a preferred embodiment comprises a sealed beam lamp unit having a glass and/or polymer envelope comprising a reflector and a light transmissive face. A light source is sealed within the envelope and focused relative thereto for producing a desired beam pattern. A trim rim reference plane is integrally molded about the exterior surface of the envelope. The rim in a preferred embodiment is integrally molded with the reflector portion of the envelope and projects outwardly therefrom to provide an integral reference plane for attaching the lamp to a vehicle. The rim is further provided with openings for receiving vehicle studs therethrough. The stud in one embodiment is provided with a back nut which is adjusted such that the forward surface thereof establishes the vehicle reference plane relative to which the lamp assembly is attached. The rim openings are disposed about the envelope in a triangular configuration. The back nut is provided with a curved outer surface for non binding engagement with the lamp rim. A rim receptacle which in one embodiment is integral with the rim, lockingly secures the rim and the lamp to the stud and hence the vehicle. The trim rim in a preferred embodiment is perpendicular to the axis of the lamp.

In these embodiments the assembly positionally interfaces the lamp to the vehicle. In still further embodiments either some or all of the vehicle fasteners are adjustable to enable optical alignment or realignment of the lamp relative to the vehicle. Particularly, by referentially locating the light source relative to a lamp envelope having a trim rim referentially secured thereto, and knowing the referential disposition of the vehicle couplers, it is possible to preaim the lamp assembly so that it is attached in aimed alignment to the vehicle in a single step. Replacement lamps are also preaimed or adjustably preaimed.

These and other objects and features and a more complete understanding of the aspects of this invention will be apparent from the following detailed description which taken in conjunction with the drawing represents a preferred embodiment of this invention.

DESCRIPTION OF THE DRAWING

FIG. 1 is top perspective view partially in cross section of the trim rimmed headlamp assembly of the present invention as attached to a vehicle.

FIG. 2 is a partial cross sectional view of a fastener assembly employed in combination with the assembly of the present invention.

FIG. 3 is front view of the trim rim attachment assembly of the present invention.

DETAILED DESCRIPTION

Referring now to FIG. 1, the trim rimmed headlamp 10 is shown attached to a vehicle 11. The headlamp 10 has an envelope 12 which includes a reflector 14 sealed to a lens 15. A light source 16 is sealed within the envelope 12 and focused relative thereto such that the optical axis of the beam substantially coincides with the axis of the lamp. In a preferred embodiment, the light source 16 is focused relative to the reflector 14 and takes full advantage of the reflective properties of the reflector 14. A rim 17 is integrally molded with the exterior surface of the envelope 12 and in a particular embodiment, the rim 17 is integrally molded with the reflector 14. The rim 17 is referentially disposed relative to the reflector 14 which in combination with the light source 16 establishes the desired beam pattern. The rim 17 thus provides a reference structure which characterizes the beam. In a preferred embodiment the rim 17 is molded perpendicular to the optical axis of the lamp and hence the axis of the beam.

The beam pattern produced by the lamp unit 10 is the combined result of the interaction of the light source 16 with the envelope 12. Specifically, the light source 16 is positioned within the envelope 12 to achieve an optically optimal light distribution and hence the light source 16 is focused relative to the envelope 12 regardless of whether the light source 16 is located at the exact geometric focus of the conical reflector 14. In a particular embodiment, the light source 16 is focused relative to the reflector 15 alone or alternatively is focused relative to the reflector 14 and lens 15 in combination. In the former instance an optimal beam pattern is established by the reflector 14 which is subsequently modified by the lens prescription. The reflector 14 thus structurally references the beam without regard for lens tolerances. The beam axis thus substantially coincides with the lamp axis. In the latter case, the light source 16 is adjusted within an envelope 12 comprising both a lens 15 and reflector 14 to produce an adequate beam pattern. Although the envelope focused beam pattern is inherently less precise than the reflector focused beam pattern the beam axis remains substantially parallel to the optical axis of the envelope.

In either case the lamp beam is characterized by a plane which is approximately perpendicular to the beam axis (Z axis, axis in the major direction of its propagation). The reference plane of a lamp is defined conventionally, by the forward surfaces of the reference beads located on the face of lamp 10. The bead surfaces are ground to define a reference plane which perpendicularly characterizes the lamp beam. In particular, three beads are employed on the lamp face wherein the surface of the three beads determine the plane.

The assembly 10 of the present invention eliminates the need for reference beads on the face of the lamp. The rim 17 provides the reference for the attached lamp 10. Although the rim 17 can form a variety of different configurations, it is necessary that the rear surface thereof have a predefined configuration at the points of its attachment for referentially relating the lamp 10 to the vehicle 11. In a particular embodiment, the rim 17 is substantially planar and and projects radially outward from the lamp envelope 12 in a plane which is substantially perpendicular to the axis of the beam. The forward surface of the rim 17 can have a variety of configurations which for instance decoratively interface the lamp 10 with the vehicle 11 while the rear surface thereof is substantially planar.

The rim 17 is provided with a plurality of openings 21 arranged for instance in a triangular configuration about the rim 17 as shown in FIG. 3. The openings are provided for receiving for instance studs 25 therethrough one of which is shown in FIG. 2. Each stud 25 is attached to the vehicle 11 by for instance welding. The stud 25 is also provided with a back nut 26 which for instance threadably engages the stud 25 and is spaced from the vehicle 11. The back nut is adjusted relative to the vehicle 11 to establish a reference for aligning the lamp 10 relative thereto. In a preferred embodiment the vehicle 11 is provided with three studs 25 having adjustable back nuts 26 applied thereto for defining at the forward surface of the nuts, a vehicle reference plane for referentially aligning the lamp 10.

The forward surface of each back nut 26 is curved to provide a non binding surface against which the rim 17 is attached. More particularly each back nut 26 is provided with a curved base 27 and a cylindrical channel 28 articulated therefrom. Each cylindrical channel 28 is inserted within one of the openings 21 of the rim 17. The rear reference surface of the rim 17 abuts the forward surface of each back nut base 27 and is referenced thereto. The anterior end of the stud 25 projects through one of the rim openings 21 and is engaged by a rim receptacle 29 from the exterior of the rim 17. The rim receptacle 29 in alternate embodiments is separate from the rim 17 or attached thereto forming a unitary construction. Although the rim receptacle is shown as a nut which, for instance is formed from a polymer material, the receptacle can have a variety of different configurations and be for instance a speed nut. The rim receptacles 29 are tightened to the studs 25 for lockingly securing the lamp 10 in aligned position to the back nuts 26 and thus to the vehicle 11. The back nuts 26, have flats for engaging a tool, about the exterior of the anterior end of the cylindrical channel 28 for adjustment of the lamp aim of the back nuts from the front of the lamp.

Accordingly the lamp 10 is readily and demountably attached to the vehicle 11 by the assembly of the present invention. The lamp 10 can also be easily replaced with a similar rimmed headlamp and installed in a prealigned relationship with the vehicle 11 by the simple removal and reattachment of the rim receptacles 29.

Although the invention has been described in its preferred form with a certain degree of particularity, it is understood that the present disclosure of the preferred embodiment is made by way of example and that various modifications in the details of construction may be resorted to without departing from the true spirit and scope of the invention. It is intended that the patent shall cover, by suitable expression in the appended claims whatever features of patentable novelty exist in the invention disclosed.

What I claim as new and desire to secure by United States Letters Patent is:

1. A sealed beam headlamp assembly comprising an envelope, having a reflector and light transmissive lens, a light source sealed within and focused relative to said envelope, and a trim rim integrally molded with and projecting outwardly from the exterior of said envelope, said rim having a plurality of openings therein for receiving studs therethrough.

2. A sealed beam headlamp assembly as defined in claim 1 wherein said rim defines a plane substantially non-perpendicular to the lamp axis.

3. A sealed beam headlamp assembly as defined in claim 1 wherein said rim is integral with the reflector portion of said envelope.

4. A sealed beam headlamp assembly as defined in claim 1 wherein said rim has rotatable receptacles secured thereto and engaging said studs to hold said assembly in place.

5. A sealed beam headlamp assembly as defined in claim 1 wherein said rim has a substantially planar rear surface about said openings.

6. A sealed beam headlamp assembly as defined in claim 1 wherein said rim is substantially planar.

7. A sealed beam headlamp assembly as defined in claim 1 wherein said rim defines a plane substantially perpendicular to the lamp axis.

8. A sealed beam lamp unit as defined in claim 1 wherein said assembly comprises a polymeric material.

9. A sealed beam lamp unit as defined in claim 1 wherein said assembly has a light beam axis substantially parallel to the lamp optical axis.

10. A sealed beam lamp unit as defined in claim 1 wherein back nut stops, disposed in the rear of said trim openings, referentially engage said rim and threadably engage said studs.

11. A polymeric, sealed beam headlamp assembly comprising an envelope, having a reflector and light transmissive lens, a light source sealed within and focused relative to said envelope, a light beam axis substantially parallel to the lamp optical axis, and a substantially planar trim rim integrally molded with and projecting outwardly from the exterior of said reflector, defining a plane substantially perpendicular to the lamp axis, having three openings therein for receiving studs therethrough, with back nut stops disposed in the rear of said openings, referentially engaging said rim and threadably engaging said studs, wherein rotatable receptacles secured to said rim engage said studs.

* * * * *